ELECTRON BEAM FABRICATION SYSTEM AND PROCESS FOR USE THEREOF

WITNESSES:

INVENTORS
Robert M. Handy, Stephen J. Angello,
Paul R. Malmberg & Terence W. O'Keeffe
BY

ATTORNEY

July 25, 1972 R. M. HANDY ET AL 3,679,497

ELECTRON BEAM FABRICATION SYSTEM AND PROCESS FOR USE THEREOF

Filed Oct. 24, 1969 3 Sheets-Sheet 2

United States Patent Office 3,679,497
Patented July 25, 1972

3,679,497

ELECTRON BEAM FABRICATION SYSTEM AND PROCESS FOR USE THEREOF

Robert M. Handy, Export and Stephen J. Angello, Paul R. Malmberg, and Terence W. O'Keeffe, Pittsburgh, Pa., assignors to Westinghouse Electric Corporation, Pittsburgh, Pa.

Filed Oct. 24, 1969, Ser. No. 869,229
Int. Cl. B44c *1/22;* H01j *37/26;* B23p *1/00*
U.S. Cl. 156—2 15 Claims

ABSTRACT OF THE DISCLOSURE

A system for fabrication of patterns in substrates such as integrated circuits on silicon wafers, employs a scanning electron microscope to produce a photocathode having the desired surface pattern therein and the photocathode is then employed to produce replicate patterns on a plurality of substrates. The photocathode produces a patterned electron beam which impinges on an electron resist on a substrate to provide for differential solubility between the electron beam treated and untreated resist areas. Removing the more soluble portion of the electron resist after treatment by the photocathode, exposes the substrate surface which is then altered either physically or chemically. One or more highly precise patterns both in their location and configuration, may be produced on the surface of a substrate by applying a series of successive electron resists to the substrate and using a plurality of photocathodes.

This invention was made under U.S. Government Contract F33615-67-C1335.

PRIOR ART

At the present time, integrated circuits are produced by using photo resist and masking techniques. However, even under the best of circumstances, these techniques cannot be maintained with a precision of five microns or better and, in practice, clearances and precision of about 1 mil are more normal since masks are normally placed and aligned on wafers by operators working with a microscope. In photo resist and mask techniques, damage and loss occurs because of the physical disposition of a mask directly on a substrate such for example as a silicon wafer. As a result of all of these shortcomings, the yield of usable semiconductor wafers becomes progressively lower with an incresing number of photo resist and mask treatments.

In order to avoid the use of contact masks, it has been proposed to employ photographic projections of a pattern upon a photo resist coated wafer. The shortcomings of this proposed process are based on the optical resolution limits of from 1 to 2 or more microns depending on the focal length of the projection system and the extremely critical depth of focus requirements which limit the available resolution to a practical lower limit value of about 5 microns at best.

It has been proposed to employ a scanning electron microscope to trace a desired pattern on a wafer coated with an electron resist. The resolution of the electron microscope can be 0.5 micron and less. However, the time to treat the surface of a silicon wafer of an inch diameter, for example, is of the order of an hour. With increases in speed of scanning by appropriate computer controls, this time may be reduced to 20 minutes or so. However, these times are simply out of the question for producing on a commercial basis integrated circuits which on the average require six resist layers which must be separately processed. The costs per wafer would be astronomically high if the scanning electron microscope were to be used for all of the resist processing.

SUMMARY OF INVENTION

The invention encompasses a process and apparatus enabling one to produce in a relatively brief period of time on a plurality of substrates precisely located altered surface areas by first preparing, by means of a scanning electron microscope, a photocathode which comprises a body of material such as quartz substantially transparent to ultraviolet light, the body having a planar surface with a layer of metal readily oxidized to an oxide which is opaque to ultraviolet light, the metal layer being coated with an electron resist which when subjected to a beam of electrons from the scanning electron microscope in accordance with a predetermined scanning pattern which is preferably carried out by digital control from an electronic data processing machine, such as a computer. The electron beam treated body is then processed to remove those portions of the electron resist which are more soluble than other areas by reason of the electron beam treatment whereby to expose a precise pattern of the layer of metal not covered by the electron resist. This metal is then etched or otherwise removed away leaving only the desired patterned configuration of the metal layer protected by the resist. The resist is then removed from the entire body of ultraviolet transparent material and the exposed layer of metal is oxidized to the oxide which is opaque to ultraviolet light which is disposed on the planar surface in a desired pattern. There is then applied a layer of a metal which will emit or generate electrons when exciting radiation such as ultraviolet light impinges thereon, for example gold or palladium, so that when the back surface is illuminated with ultraviolet light an electron beam is emitted from those portions of the metal resting directly on the body of ultraviolet transparent material but not from those portions which have been deposited on the metal oxide. This treated body comprises a photocathode.

The resulting photocathode is then placed within an electron beam projecting tube which is surrounded by a focusing magnet and a series of substrates which are to be treated by the electron beam therefrom can be individually disposed with a planar surface having an electron resist thereon spaced a short distance from the planar surface of the photocathode and a potential is applied therebetween, making the photocathode cathodic and the substrate anodic. Upon applying ultraviolet light to the back surface of the photocathode a beam of electrons is projected upon the electron resist on the planar surface of the substrate whereby to render precisely configured and located surfaces of the electron resist preferentially soluble. Means are provided for precisely orienting the electron resist coated substrate with respect to the photocathode so that the electron beam pattern impinges upon a precisely selected area of the substrate. After the substrate has had its applied electron resist rendered appreciably soluble in the predetermined patterned areas, it is then subjected to a suitable solvent to remove the electron resist at the areas so rendered more soluble, thereby exposing predetermined patterned areas of the surface of the substrate. The exposed surfaces of the substrate can then be chemically and/or physically altered as by etching, oxidizing, applying of layers of other metals including epitaxial layers, diffusing doping materials therein, and the like. Thereafter the remainder of the electron resist may be removed from the substrate by a suitable solvent. One or more subsequent layers of electron resist can be applied so that the substrate may be processed by means of one or more additional photocathodes produced in an electron scanning microscope in accordance with the previous description for the first photocathode.

The invention also encompasses apparatus which comprises a vacuum chamber in which there may be placed the photocathode and the substrate to be treated therewith. Means are provided for introducing one or more photocathodes, as for example by means of a vacuum lock or by initially stacking photocathodes in suitable carriers or in a storage rack with mechanical means for selecting a photocathode from a storage rack and placing it in position for use. Electron resist coated substrates may be introduced into the vacuum chamber by a vacuum lock or a stack thereof may be initially disposed within the vacuum chamber and successive substrates can be picked up and exposed one after another to the electron beam from any selected photocathode. The vacuum chamber also comprises suitable mechanism for orienting and aligning the photocathode and substrate in a precisely determined position with an accuracy of one micron or less if such precision is desired.

It is an object of the invention to provide a process for producing photocathodes having a desired pattern of electron beam emitting surfaces by a scanning electron microscope and then employing the photocathodes to subject electron resist treated substrate surfaces to a patterned electron beam to render precisely selected portions of the electron resist more soluble to a given solvent than the other portions.

Another object of the invention is to provide a process for photocathodically treating electron resist coated substrates to render precisely selected portions of the electron resist preferentially soluble in a given solvent.

A still further object of the invention is to provide an apparatus for enabling one or more electron resist coated substrates to be oriented in a precise position with respect to a photocathode and means for subjecting the electron resist on such positioned substrate to be subjected to a precise predetermined pattern of electron beams to render the surface thereof differentially soluble in accordance with such pattern.

Other objects of the invention will in part be obvious and will in part appear hereinafter. For a better understanding of the objects of the present invention, reference should be had to the following drawings, wherein.

DETAILED DESCRIPTION OF THE INVENTION

While the present invention is suitable for producing many different varieties of members whose surfaces have been treated in accordance with this invention to produce altered surfaces such for example as thin metal sheets which are etched away at selected areas into shapes suitable for various scientific and industrial applications such for example as fluid amplifiers and waveguides, a particularly promising application of the invention is in the production of semiconductors and particularly integrated circuits including LSI (large scale integration). It will be understood that it is commercially desirable to be able to produce a plurality of devices in a reasonable time and at a reasonable cost having surface areas altered physically or chemically as for example in integrated circuits. In order to secure a high yield of consistently reliable electronic performance from the integrated circuits, it is necessary that the surfaces be altered in precisely located areas. This precision is particularly important when a plurality of successive surface treatments are applied to one substrate. In many cases in the integrated circuit industry, six or more successive treatments must be applied to a single wafer with critical precision, and ten or more successive resist and surface altering treatments are necessary to secure a suitable integrated circuit device for sophisticated electronic applications.

The electron beam system and processes of the present invention avoid all physical contact of a mask with any substrate. An electron resist can be applied, treated and removed with an infinitesimal amount of damage of injury to the substrate. Most importantly, however, the electron beam treatment enables a precision of one micron and even less both in the location of successive patterns with respect to a given point on a substrate as well as with respect to patterned areas produced by successive treatments. A precision of the order of 0.5 micron or less on a regular basis is reasonably attainable. Also, the speed at which electron resist coated substrates can be processed is relatively great, times of the order of five seconds per electron beam exposure using a photocathode are reasonably attainable.

Figure 1:
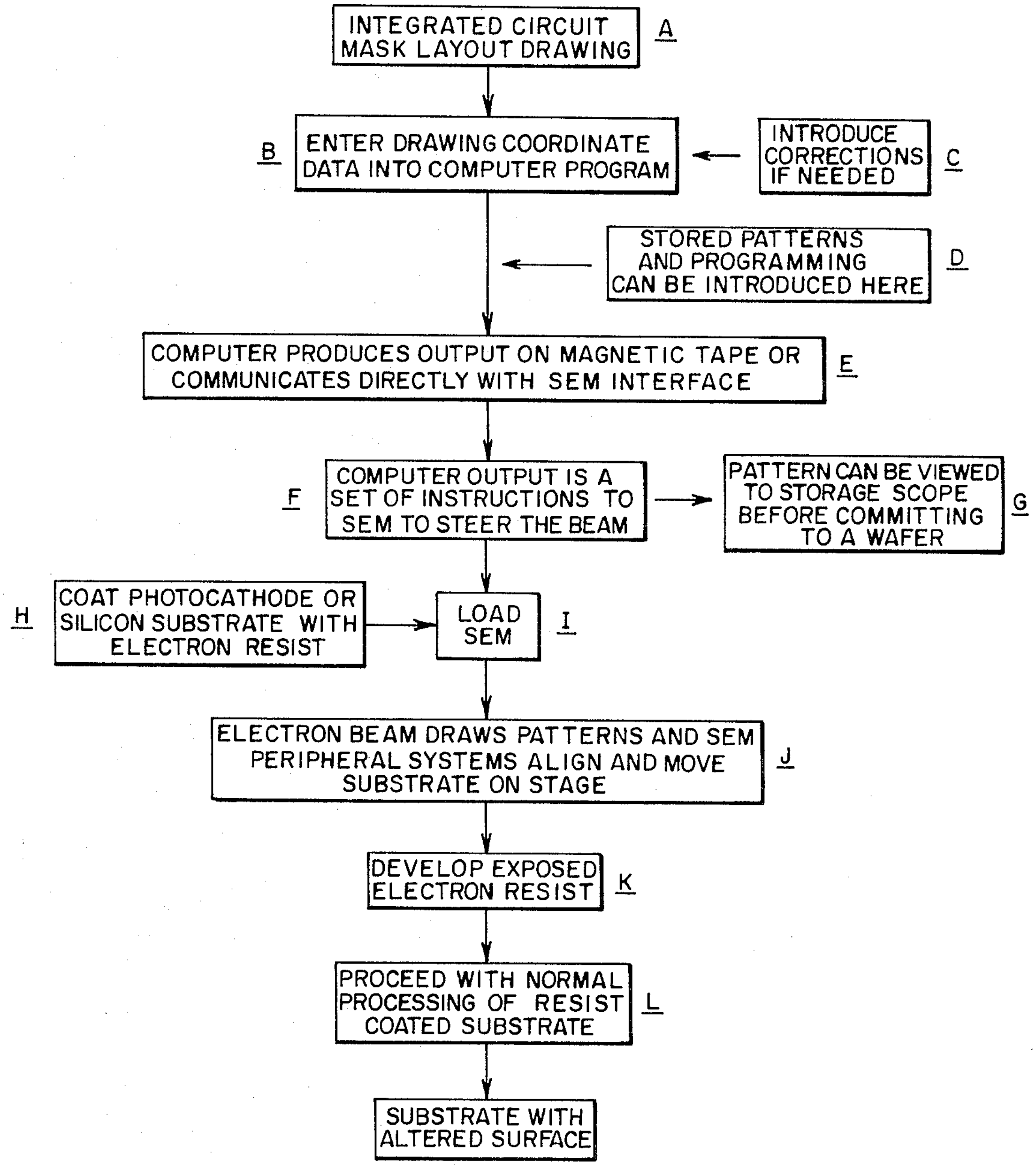
FIG. 1 is a block diagram of the steps of the process to produce a photocathode.

Referring to the block diagram of FIG. 1, there is illustrated a typical process which may be employed for producing integrated circuits by the practice of the present invention. At step A, an integrated circuit mask layout drawing is prepared in accordance with conventional techniques. While drawings using standards and conventions such as are employed at the present time for photo techniques may be employed, drawings may be prepared with closer spacing of various portions with the assurance that they can be produced and the reliability of the final device will not be adversely affected. It will be understood that a plurality of separate mask configuration drawings are to be made for complex devices. The drawing coordinate data are then translated at step B into a computer program. The program can be initially test run by being applied to a storage scope or applied to a wafer to produce a desired treated substrate through a scanning electron microscope. Visual examination of the storage scope or of a wafer under the microscope following the test will enable corrections to be introduced at step C if necessary. A light pen enables changes to be made on the light scope immediately and the computer will enter the corrections into its program. This constitutes a great reduction of time as compared to the conventional mask drawings which may require days for corrections to be discovered and then made.

Additional stored programs and other programming can be introduced at step D, such for example as instructions to move a stage in the scanning electron microscope (SEM) so as to present to the scanning electron microscope beam another area of the substrate inasmuch as the total resolution field of the scanning electron microscope is ordinarily not in excess of 80 x 80 mils, whereas substrates may be as much as two or three inches in diameter. If desired, the computer output may be put on magnetic tape at step E, if it is desired to use it to control a plurality of scanning electron microscopes located at the same or different locations. In some cases, the computer can directly communicate with the scanning microscope mechanism. Ordinarily, the computer or the magnetic tape issue digital control instructions as indicated at F. In order to be assured of the precision and accuracy of the pattern to be imparted to the scanning electron microscope from the final magnetic tape or computer, output can be viewed in a storage scope as indicated at G before actually operating on a photocathode or on a wafer.

In order to check the accuracy and precision of the computer or magnetic tape instructions, it is desirable initially to process a conventional silicon wafer, for example, in to an integrated circut. In this case, as indicated at step H, the silicon wafer is coated with an electron resist either positive or negative, and then the wafe is loaded into the vacuum chamber on the stage within the scanning electron microscope, as indicated at step I. This stage is controlled in the X and Y directions by suitable controls operable from the computer so as to shift successive areas roughly 80 mils apart under the electron beam. The wafer itself may be provided with orientation marks or indicia so that it may be placed in the precisely identical position on the stage of the electron microscope for successive resist and electron beam treatment procedures.

At step J, the electron beam under the instructions from the computer or magnetic tape causes a pencil of electron beams to impinge on the electron resist and in a sense draw a pattern to produce either a more or a less soluble electron resist wherever the beam impinges depending on whether a negative electron resist or a positive electron resist is applied to the silicon. One or more areas 80 x 80 mils may be treated by the electron beam. When the entire silicon wafer has been treated as desired, it is then removed at step K from the electron microscope and subjected to a solvent which will dissolve only the more soluble areas of the electron resist. At step L, the areas of the silicon wafer exposed by removal of the electron resist will then be processed normally, that is, it will be doped by diffusion, etched, oxidized or a layer of epitaxial silicon deposited thereon, at the exposed areas. Where the electron resist remains the silicon wafer surface will not be affected by an etchant for silica which usually covers the wafer surface. The wafer with the resist removed from the remaining oxide layer is processed. Then another coating of electron resist is applied and the wafer reprocessed in the scanning electron microscope using another tape or computer program. Eventually a fully processed silicon wafer is produced and may be tested as an operating device.

Normally the silicon wafer will be carefully examined after each surface treatment under high magnification to determine the accuracy and the precision of the altered areas resulting from each separate electron beam treatment. If this is satisfactory, a photocathode is prepared by substitution at step H of a flat quartz disk having at least one planar surface upon which there has been applied a titanium film by vacuum evaporation or equivalent technique. Disks of sapphire or lithium fluoride may be used in lieu of quartz. A titanium film of a thickness of a fraction of a micron is sufficient. A layer of 600 A. of titanium has given good results. It is baked at 160–170° C. for several minutes in air to slightly oxidize the metal surface for better etchability.

An electron resist coating is applied over the titanium layer and the quartz disk is then introduced into the scanning microscope at step I. When the quartz disk has been properly positioned on the electron microscope stage and the chamber evacuated, the electron beam is caused to impinge in accordance with the computer or magnetic tape instructions upon the electron resist coating to cause the coating to degrade if it is a positive electron resist thereby rendering it more soluble or to polymerize further into a relatively less soluble resist if it is a negative resist.

The electron resist coatings are light insensitive and have relatively long shelf life and are relatively stable. Examples of negative resists are polystyrene, polyacrylamide resins, polyvinyl chloride and certain selected hydrocarbon silicones. Examples of positive resists are polyisobutylene, polymethylmethacrylates, and poly(alphamethyl styrene).

A good positive resist is polymethylmethacrylate of an average molecular weight of over 100,000 containing a very low fraction of polymer having molecular weight of 50,000 or less to avoid pin holes during processing. It is rendered readily soluble in either 95% ethanol (5% water) or in a mixture of 30% by volume of methylethyl ketone and 70% isopropanol when subjected to an electron beam at 10 kv. to apply $5\times10^{-5}$ coulombs per cm.$^2$. The portions so exposed are soluble in the previously mentioned solvent, whereas the remainder of the resist is not soluble.

Polyacrylamide is a good negative resist inasmuch as an electron beam at 10 kilovolts applying $3\times10^{-6}$ coulombs per cm.$^2$ will render it slowly soluble in deionized water, while the remainder will resist concentrated phosphoric acid which renders it useful as a coating for aluminum. This electron resist is not removed by most organic solvents such as methanol. It forms an excellent mask for a sputtering etch treatment of the substrate. The average molecular weight of a good polyacrylamide resist that has given good results is $4.7\times10^7$.

After the quartz disk with its applied electron resist has been treated in the scanning electron microscope, it is then removed and subjected to a given solvent to remove the areas rendered more soluble following the electron beam treatment. This will expose the titanium at the precisely located areas where the electron resist has been removed. The titanium may be readily dissolved by a suitable etchant such as a 1% MF aqueous solution to expose the planar quartz surface therebelow. Wherever the electron resist remains however, the titanium is still present. The remainder of the electron resist is thereafter removed and the titanium metal is then oxidized as for example in air at 400° C. to titanium dioxide. The final titanium dioxide film from a 600 A. titanium metal layer will be about 1000 A. in thickness. An adherent dense coating of titanium dioxide is present on the selected areas of the planar quartz surface. If desired, a thin protective layer of silica or an ultraviolet transmissive material such as Pyrer glass can be sputtered over the titanium dioxide layer.

The quartz disk is then placed within a vacuum sputtering chamber and a 10 to 40 angstrom thickness layer of palladium is applied to provide the electron emissive layer. Other metals such as gold may be used as a substitute for the palladium.

When viewed from the opposite or back surface of the quartz disk, there will be evident a precise pattern of palladium metal at the desired electron emissive areas, with the remainder of the front surface of the quartz disk being covered with a dense titanium oxide layer which is essentially opaque to ultraviolet light. This treated quartz disk is the photocathode which is ready for use in the system for producing a plurality of treated substrates.

Figure 2:
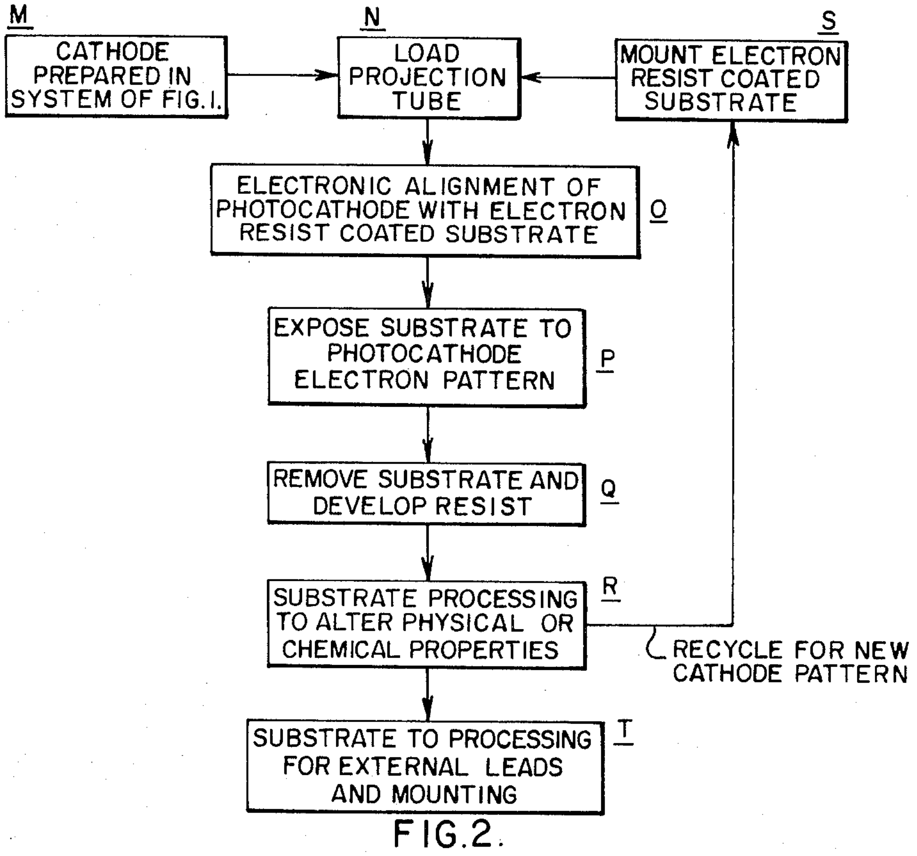
FIG. 2 is a block diagram of the process to use the photocathode to produce substrates therefrom.

Referring to FIG. 2, there is a block diagram illustrating the use of the photocathode prepared in the system of FIG. 1. The photocathode from step M is loaded into a projection tube at step N. Also a substrate which, for example, may be a silicon wafer coated with an electron resist is also placed within the projection tube at this point. As indicated in step O, the photocathode and the electron resist coated substrate are electronically aligned. There may be an initial approximate alignment by suitable mechanical means such as stops or pins against which the substrate may be fitted by mating flats and notches, and micrometer indexing means for rotating the substrate on a table and for moving the substrate in the support or carrier in X and Y directions similar to the adjustable table for a specimen in a microscope can be employed to adjust the substrate quite precisely. Thereafter electronic means may be employed to correlate an orientation mark on the substrate with the photocathode so that a precise determined area of the substrate will be affected by the electron beam from the photocathode. Such alignment means will be described hereinafter in detail with respect to specific embodiments of the apparatus. The planar surface of the substrate is substantially parallel to the planar electron emissive surface of the photocathode while the substrate is oriented in both the X and Y directions as well as in the proper angular position with respect to the cathode pattern.

At step P, the photocathode is illuminated at its back surface by an ultraviolet light source so that electrons are emitted from the palladium metal areas not masked by the ultraviolet opaque material in the photocathode. A suitable potential is applied between the photocathode and the substrate to cause the electrons to flow from the photocathode to the substrate. A suitable focusing magnetic field is applied to the area between the photocathode and the substrate so as to cause the electron beam pattern to strike the electron resist on the substrate in the predetermined pattern. With an adequate emission of electrons, the electron resist on the substrate has enough coulombs of charge applied so as to cause a distinct and substantial difference in the relative solubility of the areas of the electron resist that are not treated with electron beam, as compared with the areas that are so treated.

As a result of the electron beam treatment, the electron resist is rendered differentially soluble in a given solvent and at step Q the substrate is removed from the projection tube and subjected to the desired solvent to "develop the resist," namely to remove the more soluble parts but to leave the less soluble parts of the resist in situ on the substrate, thereby exposing predetermined bare areas of the substrate, such, for example as a silicon wafer. The treated substrate is then processed at step R to alter the chemical or physical properties of the exposed areas. Such alteration may comprise applying an epitaxial layer of silicon at the exposed areas or to diffuse a doping material therein, or to oxidize the exposed surfaces to produce a layer of insulating silicon oxide, or to etch away these exposed portions of the silicon wafer thereby leaving a depression. The development also encompasses the removal of the remainder of the electron resist after such surface alteration on the substrate, by applying thereto a suitable solvent, and then further altering the substrate by diffusion, etc.

The processed substrate may be then ready for a subsequent treatment by coating it at step S with a layer of an electron resist so that it may then be again reloaded into the projection tube along with another photocathode having a predetermined pattern of photo electron emitting material on its suface. The substrate may be reprocessed any number of times whereby to apply a succession of treatments to the wafer. In view of the electronic alignment of the wafer at step O in each cycle of treatment, the electron beam patterns from the successive photocathodes may be readily matched in a precise position with less than one micron departure from the pattern used in any previous treatment.

Ultimately, the processed wafer from step R has had its surface altered to the desired extent as, for example, a plurality of treatments adequate to produce a desired integrated circuit wafer. The processed wafer R is then moved to step T for further final processing which may comprise applying external leads and mounting or encapsulating the integrated circuit. Such further processing also encompasses the usual testing and other related steps to produce an acceptable device.

Because the substrate has not been physically contacted except with the electron resist and the necessary solvents to remove the resist, and, of course, the necessary altering treatments which are normally chemical in nature, a minimum of physical damage results to the substrate. Consequently, a very high yield of highly precisely developed surface treatments have been applied to the substrate thereby resulting in an outstanding product with a good yield.

Figure 3:
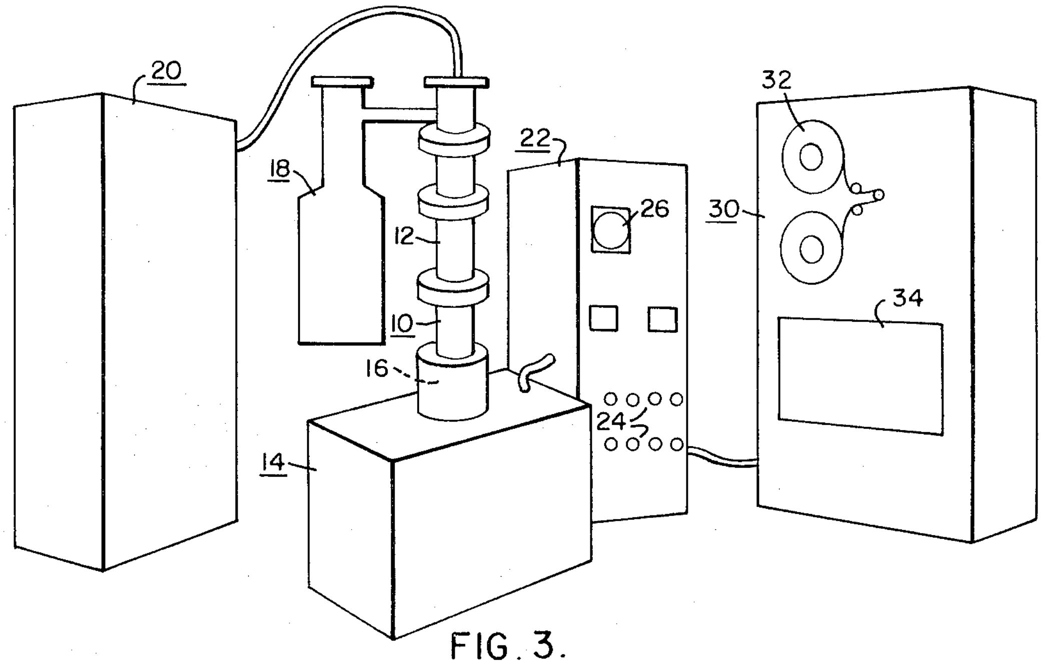
FIG. 3 is a view in perspective of the scanning electron microscope.

Referring to FIG. 3 of the drawing, there is illustrated apparatus for carrying out the steps illustrated schematically in FIG. 1. The apparatus of FIG. 3 comprises the scanning electron beam microscope 10 which comprises the electron beam microscope proper 12 mounted on a support 14. Schematically shown is the loading chamber 16 which comprises a stage on which a substrate to be processed is mounted and capable of being moved while on the stage not only to orient the substrate with respect to the electron beam but also to move the substrate to selected successive positions where the area of the substrate to be treated is much greater than the normal 80 x 80 mil traverse area of the electron beam. A vacuum pump 18 is provided for pumping out the electron microscope chamber. A power supply 20 is provided to energize not only the electron beam but also the focusing and beam control magnetic fields which cause the traversing of the beam back and forth and its suppression or extinction at points where no electron beam reaction is desired. Such apparatus is more or less conventional and is well known in the art.

Also associated with the scanning electron microscope is apparatus 22 which includes the scanning electron microscope controls 24 and a viewing scope 26, which viewing scope may comprise a storage scope so that the cumulative areas being processed by the electron microscope can be observed.

Also schematically shown is the electronic data processing equipment 30 which will comprise a magnetic tape 32 operative on various interphase circuits 34 which affect the scanning electron microscope controls 24 and thereby control the operation of the scanning electromicroscope in its operations.

The electronic data processing equipment will comprise a computer which controls the electron beam of the scanning electron microscope in accordance with the drawing originally made of the desired pattern required in the substrate. The computer will align the pattern with an index mark, or if desired it will apply an orientation index mark or a plurality of marks, on the substrate so that the substrate can be aligned with preceding or successive substrates. After an 80 x 80 mil area has been fully processed, the computer will energize the stage supporting the substrate and move it, say an X distance of 100 mils, and repeat the pattern. After making 5 to 10 repeated patterns in a row on a one inch substrate, the computerized control will move the substrate 100 mils in the Y direction and produce a series of from 5 to 10 repeated patterns in the X direction, after which it will progress another 100 mil step in the Y direction, and so on.

Figure 4:
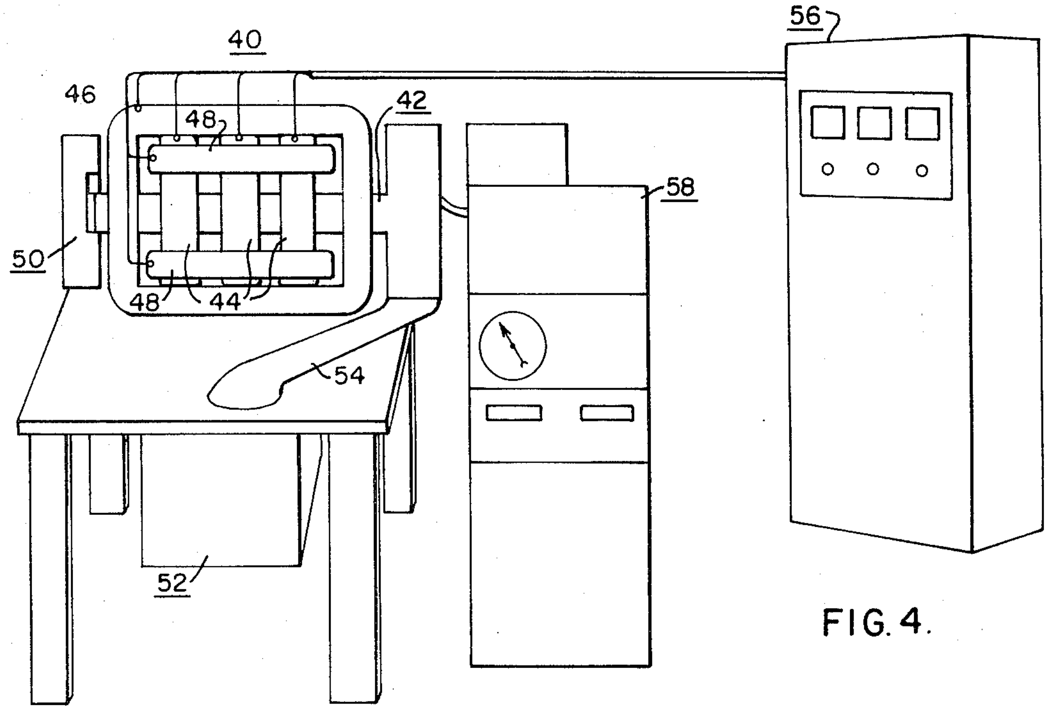
FIG. 4 is a perspective view partly in section of the photocathode apparatus.
Figure 5:
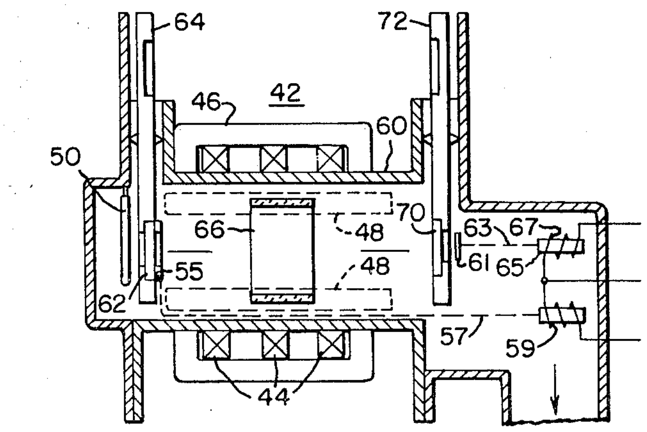
FIG. 5 is a view in cross section of the photocathode chamber proper.

Referring to FIG. 4, there is illustrated the apparatus effective to carry out the electron beam photocathode operations schematically shown in FIG. 2. The photocathode tube and its associated appurtenances are shown generally at 40. A loading chamber 42, which is shown in more detail in FIG. 5, is associated with focusing magnets 44, and X and Y directional solenoid magnets 46 and 48 and an ultraviolet light source 50. A vacuum system 52 is connected by suitable conduits 54 to the loading chamber. A power supply 56 is provided to apply a suitable potential between the photocathode and the substrate, for example, from 10 to 30 kilovolts. Electronic alignment equipment shown generally at 58 is also associated with the loading chamber so as to properly align the substrate with the photocathode. The magnets 44, 46 and 48 are energized by the magnet power supply 58.

Referring to FIG. 5, there is illustrated in more detail the loading chamber 42. The loading chamber comprises a suitable hermetically sealed walled chamber 60 in which a cathode 62 mounted in a holder 64 can be moved through a vacuum lock, either rotary or slidable, into the chamber 60. Means, such as a ring 55 and rod 57 operable by solenoid 59, are provided for holding the cathodes and for moving them down into a predetermined position at the central portion of the projection tube, namely at position 66. Substrates 70, for example, a silicon wafer which may be mounted in a holder which will orient the wafer, for instance, by reason of the usual flat side and a notch fitting against a pin within a few mils of its desired exposure position, are loaded through a vacuum lock 72, rotary or slidable, into the chamber 60. Suitable means such as a support 61 movable with arm 63 operated by plunger 65 of solenoid 67 are provided for lifting the substrate mounted in the holder from its position in lock 72 to position 66, where its planar surface is approximately one centimeter from the planar surface of the photocathode. The solenoids 59 and 67 are connected by wiring to a source of current outside chamber 42.

In order to orient the substrate to the photocathode, there are provided electronic means operating by reference to orientation indicia on the substrate which may be set in operation to not only move the substrate in the X–Y directions, but also to rotate it angularly to the final desired position with respect to the photocathode, which positioning can be within the accuracy of 0.25 micron or even less.

In order to orient the substrate with respect to the photocathode, as well as the substrate in a scanning electron microscope, it has been found that an excellent alignment detecting system comprises a layer of silicon dioxide on a silicon substrate with a micron deep mark in the form of a cross with tapered arms 6 mils in length A thin layer of aluminum can be applied over the oxide and a potential applied between the aluminum and the silicon substrate. When a beam comprising a narrow pencil, of one micron diameter, for example, of electrons is passed over the surface there is a decided change in the current as the electron beam passes the edge of the mark. This generated signal can be viewed in a cathode ray tube scope, or it can be employed to energize the angular and X and Y movement means to adjust the substrate. This specific alignment technique is the invention of less than all the inventors in this application.

However, for most easy operation of the aligning there are provided electronic means for shifting the electron beam pattern. Surrounding the loading chamber are a series of two different magnetic coils, in addition to the focusing coils 44 which are disposed circumferentially around the chamber 60, namely, pairs of Helmholtz coils 46 and 48. The coils 46 and 48 are disposed at right angles to each other and with their axes perpendicular to the electron beam so that by suitable energization thereof with direct current, the electron beam from the photocathode may be shifted in the X and Y directions with respect to the surface of the substrate. Suitable current control means may be applied to the coils 46 and 48 to control with great precision the exact point at which the electron beam pattern from the photocathode will strike the substrate. Optical means may be provided for observing the position of the substrate as, for example, a microscope having cross hairs which may be focused upon a particular mark or marks upon the substrate and then the magnetic coils 46 and 48 are suitably energized by a current source to shift the image from the photocathode to impinge at the precise position on the substrate. Self operable means may be provided so that the directional magnets can be operated automatically to align the electron beam image with respect to a mark on the substrate.

Figure 6:
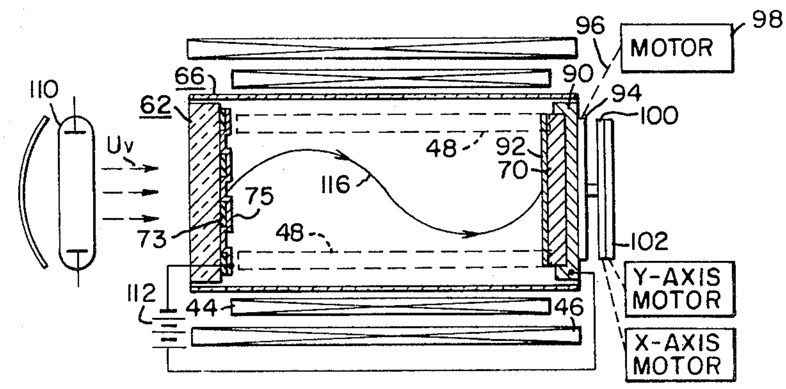
FIG. 6 is a cross section through a photocathode tube showing schematically its mode of operation.

Referring to FIG. 6 of the drawings, there is illustrated in somewhat greater detail the loading chamber employing the photocathode 62 which comprises the patterned ultraviolet mask layer 73 and the electron emitting layer 75 thereon. The photocathode 62 is disposed at one end of the chamber 60 while at the other end of the chamber 60 is a suitable holder 90 in which is placed the substrate 70 provided with the electron resist coating 92 at its upper surface. The focusing magnets 44 are disposed about the space between the photocathode 62 and the substrate 70. Suitable axially rotatable means 94 driven by gear means 96 are provided to angularly adjust the substrate with respect to the photocathode. The means may comprise a motor 98 energized from the exterior of the chamber to rotate the holder 90 to any suitable angular position. In a similar manner, X direction adjustable means 100 and Y directional adjusting means 102 are provided for moving the support 90 with the substrate 70 thereon to a desired position with respect to the photocathode. The mounting holder 90 may be moved by normal switching of motor 98 and means 100 and 102 so that the location of the substrate is within one mil or less of its desired position, or in some cases to a given position with a precision of the order of one micron of the substrate with respect to the photocathode. By operating the Helmholtz coils 46 and 48, the substrate can be as precisely located as is desirable to be impinged by and with respect to the electron beam pattern from the photocathode. The photocathode 62 may be held in a suitably adjustable holder applied to its circumference (not shown) similar in its movement to the adjusting means illustrated for the substrate support 90. An ultraviolet source 110 is disposed to irradiate the back surface of the photocathode 62 with radiation which will cause the portions of electron emissive layer 75 not shielded by the mask layer 73 to emit a patterned beam of electrons. A source of high potential 112 cathodically connected to the electron emissive layer 65 and anodically connected to the substrate support 90 provides the potential for causing the electrons to flow from the photocathode to the substrate. Energization of the focusing magnet 44 enables the electron pattern to be directed upon the substrate, subject to any corrections supplied by the Helmholtz magnet coils 46 and 48. It will be noted that the electron path 116 is spiral in nature due to the magnetic field of the focusing magnets. The spiral may comprise one complete rotation of an electron path so that at the point of impingement it has returned to a point corresponding to the point projected from the photocathode surface. Owing to the relatively great depth of focus of the electron beams, the precision with which the substrate 70 must have its upper planar surface and resist coating 92 located with respect to the planar surface of the layer 75 is not critical but has substantial latitude.

While the system of FIG. 6 directs essentially the identical size of pattern as that present on the photocathode surface, it may be desirable in some cases to employ a suitable magnetic field so that the electron beam image is reduced in size by a factor of, for example, two. In this way, very small images may be projected upon the photo electron resist as compared to the original photocathode image, with a corresponding increase in sharpness of detail. Likewise, the photocathode image may be magnified in order to cover a larger substrate than the size of the photocathode. The degree of magnification or reduction or the selection of no magnification of the electron beam pattern is optional with the user.

It will be understood that while the invention has been described by reference to a photocathode emissive layer responsive to ultraviolet light, there may be employed photo electron emissive materials responsive to other wavelengths of radiation. However, outstanding results have been obtained with ultraviolet responsive electron emissive materials such as palladium and gold and they have given excellent results in practice.

The electron beam affects the relative solubility not only of organic resists but also of various inorganic compounds. Thus silicon dioxide and silicon nitride ($Si_3N_4$) coatings on a substate when subjected to an electron beam are rendered more soluble in an etchant. Buffered hydrofluoric acid will dissolve more readily the electron beam treated portions of a silica layer as compared to that portion of the layer not treated with the electron beam. This is known as the BEER effect (bombardment enhanced etch rate). Etch enhancement ratios of about 3 are obtainable, so that the electron beam bombarded portions will be completely etched away while there will be only as little as a third of the unbombarded layer that will be etched away.

For example, silicon substrates with an oxide layer of a thickness of about 10,900 A. had areas electron bombarded to a total of 0.5 coulombs per cm.$^2$, when etched electrolytically with P etch at 6 volts with the silicon being anodic, yielded etch rates of 142 A. for the unbombarded areas and 416 A. for the electron beam treated areas. When the same silicon substrate was made cathodic at 6 volts, the etch rates were 134 A. and 391 A. When the silicon was made a cathode at 15 volts, the relative etch rates were 153 A. and 460 A. per min.

There can be employed as the etchant a buffered solution of hydrofluoric acid, pH 6.5, which is an aqueous solution 18 M in $NH_4F$ and 2.62 M in HF. The electron beam can apply as little as 0.25 coulomb per cm.$^2$ to 1. coulomb per cm.$^2$ to secure enhanced etching in oxide films of about 10,000 A. in thickness. The unbombarded region being etched to 7000 to 8000 A. in thickness when the 0.5 and 1 coulomb per cm.$^2$ treated areas are completely dissolved.

The term "electron resist" therefore refers not only to organic materials but also to inorganic compounds.

The loading chamber 42 may be provided with means for holding a stack of different photocathodes resembling in form the mechanism for selecting a given record from a stack of records in a "juke box" and conveying the record to a turntable playing position, only in this case a selected photocathode is conveyed to its operating position. Substrates, such as silicon wafers, may be loaded into a stack and successive areas can be conveyed by a similar mechanism to an electron beam exposure position and then placed to one side, or released through a vacuum lock to the etxerior of the chamber for solvent treatment. Control buttons, such as are used in record players, can be pressed to select a given photocathode for a given wafer.

The substrate can comprise a wafer of silicon, for example, whose surface may be clean, or, as is more usual, it can be oxidized and/or coated with a metal such as gold or aluminum, and then the electron resist is applied thereover. After the electron beam treatment, the electron resist areas rendered more soluble are removed and the surface oxide layer or metal coating or both, on the substrate is exposed. Removal of the exposed oxide layer or metal coating by etching exposes the silicon or silicon oxide on the substrate. After etching, the removal of the remainder of the resist leaves the oxide or metal layer in a desired pattern on the substrate. Diffusion of a doping material into the silicon substrate at the oxide free areas can take place. Epitaxial layers can also be applied upon the exposed substrate. Any epitaxial layers on the oxide or on the metal coating can be removed by employing an etchant for the oxide or metal coating.

It will be understood that the above detailed drawings and description are illustrative of the invention and not in limitation thereof.

We claim as our invention:

1. In the process of producing in a relatively brief period of time a precisely located altered surface area on a substrate, the steps comprising (a) preparing a body of material substantially transparent to ultraviolet light, the body having a planar surface with a layer of a readily oxidizable metal applied thereto, the oxide of said metal being opaque to ultraviolet light, and applying a coating of an electron resist over the layer of metal, (b) disposing the electron resist coated body of material within the effective field of a scanning electron microscope and exposing precisely located predetermined areas of the electron resist to an electron beam in the microscope of a suitable intensity to cause portions of the electron resist coating affected by the electron beam to become soluble at a substantially different rate in a given solvent as compared to the solubility of other portions of the resist, (c) applying the given solvent to the electron resist coating on the body to remove only the more soluble portions of the resist, thereby exposing the metal layer therebelow, (d) etching away the exposed metal layers not covered by the remaining electron resist whereby to expose the ultraviolet transparent material, (e) removing the remaining electron resist and oxidizing the layer of exposed metal to produce predetermined areas of metal oxide opaque to ultraviolet light, (f) applying a thin layer of a metal emitting electrons when ultraviolet light impinges thereon, so that when ultraviolet light is impinged on the back surface of the body only the predetermined areas not covered by the metal oxide will expose the electron emitting metal to the ultraviolet light so as to emit electrons therefrom, the body now comprising a photocathode, (g) placing the photocathode in an evacuated chamber, (h) disposing a substrate with an electron resist on a planar surface thereof within the evacuated chamber so that the electron resist coated planar surface of the substrate faces the planar surface of the photocathode, (i) orienting the photocathode and substrate in substantial parallelism of the planar surfaces thereof, and in a desired position with respect to each other, (j) applying a potential between the photocathode and the substrate, the substrate being anodic, and applying a focusing magnetic field in the space between the photocathode and the substrate, (k) applying ultraviolet light to the photocathode so that electrons are emitted therefrom in accordance with the predetermined pattern to impinge on the electron resist coating on the substrate in a pattern corresponding to the predetermined pattern, thereby producing areas of different solubilities in a given solvent, (l) applying the given solvent to the substrate to dissolve and remove only the more soluble portion of the resist thereby exposing a substrate surface in a selected pattern, and (m) treating the exposed surface of the substrate to alter its characteristics.

2. The process of claim 1, wherein steps (g) to (m) are repeated at least once using another photocathode with each repetition.

3. The process of producing in a relatively brief period of time a plurality of substrates each of which have an essentially identical altered surface area, comprising (a) preparing a photocathode capable of emitting a predetermined electron pattern when subjected to given wavelength of radiation by applying a scanning electron microscope beam to a body of material transparent to said given wavelength, a planar surface of the body of material being coated with a metal layer and an overlayer of an electron resist which is rendered selectively soluble at selected areas by the electron beam, removing only the more soluble selected areas of the electron resist and the metal layer so exposed, removing the remaining electron resist and oxidizing the remaining metal layer to produce an ultraviolet opaque oxide pattern on the body of material and then applying an electron emitting layer on the exposed surfaces of the photocathode, and (b) using the photocathode to process a plurality of planar surfaced substrates, each substrate being coated with an electron resist on a planar surface, by positioning each substrate in precise orientation of its planar surface to the planar surface of the photocathode and both as to $x$–$y$ direction and angular position, exposing the electron resist on the substrate to an electron beam from the photocathode, removing portions of the resist rendered more soluble than other portions because of said electron beam treatment, and altering the surface of the substrate exposed by the removal of the selected portions of the resist therefrom.

4. In the process of producing precisely disposed altered surface areas on a substrate, the steps comprising (a) providing registration indicia on the substrate, (b) applying a first electron resist coating on the substrate,
(c) disposing the electron resist coated substrate within the effective field of photocathode means for projecting an electron beam therefrom on to the substrate and orienting the substrate to a precise position by correlation of the registration indicia to said electron beam,
(d) exposing a precisely located first predetermined area of the electron resist coating to an electron beam from said photocathode means, the electron beam being of a suitable intensity and for a period of time whereby to cause the portions of the electron resist coating in said first predetermined area affected by the electron beam to become differentially soluble in a given solvent as compared to the portions of the resist not in said predetermined area,
(e) applying the given solvent to the electron resist coating to remove only the more soluble portions of the resist coating, thereby leaving the remainder of the electron resist coating or the substrate and exposing predetermined uncoated areas of the substrate,
(f) subjecting the exposed areas to treatment to alter the exposed surface areas as compared to the resist coated areas,
(g) applying to the substrate a second electron resist coating,
(h) disposing and orienting the substrate, with respect to photocathode means for projecting an electron beam by reference to said registration indicia so as to precisely locate the substrate and its altered surface areas with respect to an electron beam from said means,
(i) exposing precisely located second predetermined areas of the electron resist coating to an electron beam from said photocathode means, the electron beam being of a suitable intensity and for a period of time to effect a differential solubility of the electron resist coating between the electron beam exposed areas and remaining portions not so exposed,
(j) applying the given solvent to the electron resist coating so as to remove only the more soluble portions of the electron resist coating, thereby leaving the remainder of the electron resist coating on the substrate and exposing the uncoated surface areas of the substrate, and
(k) subjecting the substrate to a treatment to alter the exposed surface areas of the substrate as compared to the resist coated areas, thereby providing two predetermined altered surface areas of the substrate.

5. The process of claim 4, wherein steps (g) to (k) are repeated at least once to provide still further precisely altered surface areas on the substrate.

6. The process of claim 4 wherein the means for projecting the electron beam is a photocathode having a patterned electron beam projecting surface corresponding to the first predetermined area, applying an electron accelerating potential between the substrate and photocathode, and a focussing magnetic field to the photocathode is applied so as to project the electron beams from said surface upon the electron resist coating in an image having high precision of the order of 1 micron between a projected point in the electron beam image from the photocathode and a selected point on the substrate.

7. The process of claim 4 wherein the photocathode means for projecting the electron beam is itself produced by a scanning electron microscope wherein the electron beam is caused to sweep over an electron resist surface on the photocathode and affects only a predetermined area in accordance with electronic data control means so as to render selected areas of the resist more soluble, and a radiation opaque means is applied to the photocathode in accordance with the less soluble electron resist pattern and photoelectron emissive material is present in the remaining areas of the photocathode.

8. The process of claim 4 wherein the electron resist is an inorganic compound whose solubility in a given solvent is altered by exposure to electron beams.

9. Apparatus for producing a substrate with precisely disposed areas of differing chemical or physical characteristics, in combination (a) an evacuated chamber,
(b) means for introducing a photocathode member into the evacuated chamber, the photocathode having a planar electron emissive surface of predetermined pattern and area,
(c) means for positioning the photocathode member within the evacuated chamber,
(d) means for introducing a substrate into the chamber, the substrate having registration indicia thereon and having a planar surface with an applied electron resist coating thereon,
(e) means for positioning the substrate by reference to the registration indicia thereon so that the planar electron emissive surface of the photocathode and the planar substrate surface with the electron resist coating are substantially parallel to each other and the substrate is positioned at a precise angular and $x$–$y$ axis position with respect to the electron emissive pattern on the photocathode,
(f) potential means rendering the photocathode cathodic and the substrate anodic, and magnetic field means disposed about the positioned photocathode and substrate to provide a focussing magnetic field therebetween whereby to cause electrons from the electron emissive area of the photocathode to impinge upon the electron resist coating at a selected position and in a pattern corresponding precisely to the predetermined electron emissive pattern, and
(g) radiation means for generating a beam of radiation to strike the photocathode whereby to cause emission of electrons from the electron emissive surface area thereof.

10. In apparatus for producing a substrate with precisely disposed surface areas of differing chemical or physical characteristics, in combination:

(a) an evacuated chamber,
(b) means for positioning a photocathode within the evacuated chamber, the photocathode having an electron emissive planar surface of predetermined pattern and area,
(c) means for introducing at least one substrate into the chamber, the substrate having a planar surface with an applied electron resist coating thereon,
(d) means for positioning the substrate with respect to the photocathode so that the planar electron emissive surface of the photocathode is essentially parallel to the electron resist coating on the planar surface of the substrate, and the substrate is in a desired precise angular and $x$–$y$ axis position with respect to the electron beam image from the photocathode electron emissive surface,
(e) means for applying a potential between the photocathode and the substrate and magnetic field means disposed about the photocathode and the substrate to produce a focussing magnetic field therebetween whereby to cause electrons produced from the electron emissive area of the photocathode to impinge upon the electron resist coating in a pattern corresponding precisely to the predetermined electron emissive areas, and
(f) radiation means disposed to energize the photocathode to cause electrons to be emitted from the said predetermined areas.

11. The apparatus of claim 10 wherein the radiation means (f) comprises an intense ultraviolet source.

12. The apparatus of claim 10 wherein the chamber includes means for introducing any one of a plurality of photocathodes to the means for positioning the photocathode.

13. The apparatus of claim 10 wherein a plurality of photocathodes are disposed in holding means so that they may be selectively placed in position with respect to a substrate.

14. The apparatus of claim 10 wherein a vacuum lock means is provided for introducing substrates into the evacuated chamber (a).

15. The apparatus of claim 10 wherein a stack of substrates is disposed in the evacuated chamber (a) and a mechanism in the chamber is associated therewith which selects and positions substrates individually for treatment by the photocathode electron beam.

References Cited

UNITED STATES PATENTS

| | | | |
|---|---|---|---|
| 3,491,236 | 1/1970 | Newberry | 250—49.5 TF |
| 3,271,180 | 9/1966 | White | 117—93.31 |
| 3,392,051 | 7/1968 | Caswell et al. | 117—93.31 |
| 3,113,896 | 12/1963 | Mann | 117—93.31 |
| 3,086,936 | 4/1963 | Costa | 117—93.31 |
| 3,236,707 | 1966 | Lins | 156—3 |
| 3,128,378 | 4/1964 | Allen et al. | 204—157.1 R X |
| 3,519,873 | 7/1970 | O'Keeffe | 250—49.5 T |
| 3,536,547 | 10/1970 | Schmidt | 204—164 X |

JOHN H. MACK, Primary Examiner

R. J. FAY, Assistant Examiner

U.S. Cl. X.R.

96—36.2, 38.4; 117—93.31; 156—3, 8, 13, 345; 204—15, 32 S, 143 R, 143 GE, DIG 6; 250—49.5